(12) United States Patent
Alam et al.

(10) Patent No.: US 8,681,655 B2
(45) Date of Patent: *Mar. 25, 2014

(54) AD HOC WIRELESS NETWORKING

(75) Inventors: Mohammad Shabbir Alam, Redmond, WA (US); Poovanpilli G. Madhavan, Bellevue, WA (US); Ankur Agiwal, Bellevue, WA (US); Sharad Mittal, Redmond, WA (US); Xinyan Zan, Issaquah, WA (US); Frank Li, Snoqualmie, WA (US); Zhong Deng, Woodinville, WA (US); John-Paul M. Stewart, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 364 days.

This patent is subject to a terminal disclaimer.

(21) Appl. No.: 13/025,454

(22) Filed: Feb. 11, 2011

(65) Prior Publication Data

US 2011/0134799 A1 Jun. 9, 2011

Related U.S. Application Data

(63) Continuation of application No. 11/925,146, filed on Oct. 26, 2007, now Pat. No. 7,911,990.

(51) Int. Cl.
*H04L 12/28* (2006.01)

(52) U.S. Cl.
USPC .......... 370/254; 370/329; 370/463; 455/557; 709/220; 709/227

(58) Field of Classification Search
None
See application file for complete search history.

(56) References Cited

U.S. PATENT DOCUMENTS

| 5,758,070 | A | 5/1998 | Lawrence |
|---|---|---|---|
| 6,415,330 | B1 * | 7/2002 | Okanoue ........................ 709/245 |
| 6,961,575 | B2 | 11/2005 | Stanforth |
| 7,911,990 | B2 * | 3/2011 | Alam et al. ................... 370/312 |
| 2005/0152264 | A1 | 7/2005 | Siwiak |
| 2005/0152305 | A1 | 7/2005 | Ji et al. |
| 2005/0174966 | A1 | 8/2005 | Lansford et al. |
| 2006/0258289 | A1 | 11/2006 | Dua |
| 2006/0268891 | A1 | 11/2006 | Heidari-Bateni et al. |
| 2007/0016654 | A1 | 1/2007 | Bowles et al. |
| 2007/0066297 | A1 | 3/2007 | Heidari-Bateni |
| 2007/0104215 | A1 | 5/2007 | Wang et al. |

(Continued)

FOREIGN PATENT DOCUMENTS

WO WO 2007066914 A1 6/2007

OTHER PUBLICATIONS

"UWB/Wireless USB Dongle WUWBD-101 WiMedia-based Ultra Wideband Product," Gemtek Technology Inc. Specification/Description, 2 pages, gemtek.com.tw/web_driver/specs/WUWBD-101.pdf, downloaded Oct. 26, 2007.

(Continued)

*Primary Examiner* — Chi Pham
*Assistant Examiner* — Shick Hom
(74) *Attorney, Agent, or Firm* — Andrew Sanders; Micky Minhas

(57) ABSTRACT

A software architecture providing ad hoc wireless networking capabilities. The software architecture may be compatible with wireless devices, such as UWB devices operating according to the WLP communication protocol. The software architecture may include user mode and kernel mode modules, and may include a multiplexing driver framework to enable system connection to multiple ad hoc networks.

20 Claims, 8 Drawing Sheets

(56) References Cited

U.S. PATENT DOCUMENTS

| | | |
|---|---|---|
| 2007/0135046 A1 | 6/2007 | Kapur et al. |
| 2007/0147236 A1 | 6/2007 | Lee |
| 2008/0198857 A1 | 8/2008 | Kim et al. |
| 2009/0303921 A1* | 12/2009 | Manchanda et al. .......... 370/328 |
| 2009/0310578 A1 | 12/2009 | Convertino et al. |
| 2010/0316033 A1* | 12/2010 | Atwal .......................... 370/338 |

OTHER PUBLICATIONS

Lad, M. "Ultra-Wideband: The Next Generation Personal Area Network Technology," 2004, pp. 1-14, patni.com/resource-center/collateral/Pes/tp_PES_UWB_Personal-area-network.pdf, downloaded Oct. 26, 2007.

"Ultra-Wideband and Microsoft Windows," Microsoft Corporation, 2007, microsoft.com/whdc/system/bus/uwb/default.mspx, downloaded Oct. 26, 2007.

* cited by examiner

AD HOC WIRELESS NETWORKING

RELATED APPLICATIONS

This application claims the benefit as a continuation under 35 U.S.C. §120 of U.S. patent application Ser. No. 11/925,146, filed Oct. 26, 2007, now U.S. Pat. No. 7,911,990, issued Mar. 22, 2011, and entitled "AD HOC WIRELESS NETWORKING", the entire contents of which is incorporated herein by reference in its entirety.

BACKGROUND

1. Field of Invention

The technology described herein relates to computer networking.

2. Discussion of Related Art

Ultra wideband (UWB) is an emerging wireless technology with potential benefits in the realm of wireless computing. UWB operates over the region from about 3.1 to about 10.6 GHz in the radio-frequency (RF) spectrum. The potentially beneficial characteristics of UWB technology include data transmission at high data throughput speeds within a relatively short range in the wireless medium, low power consumption, low interference with existing network technologies, such as WiFi networks, and an ability to connect to multiple networks simultaneously on a same radio.

The above-mentioned beneficial characteristics of UWB promise new and useful scenarios for wireless computing. Examples of new wireless computing scenarios include wireless media-streaming over short distances, sharing digital media across multiple WiMedia Logical Link Control Protocol (WLP)-capable devices, the realization of wireless desktops, projecting desktops on a WLP-enabled projector while simultaneously using WiFi to access the internet, connecting to WiFi and WLP networks simultaneously, and enhancing robustness and throughput of existing wireless networks by setting up a secondary link with devices in close proximity. Other beneficial scenarios are likely to be discovered as UWB technology becomes more common.

To take advantage of the beneficial characteristics of UWB technology, computer systems must be designed to be compatible with the technology. In particular, it is desirable to enable networking of wireless UWB devices so that the devices can communicate with other wireless devices over the network. Networked devices communicate with each other according to communication protocols. Therefore, a device typically should be compatible with a particular protocol if it is to communicate over a network operating according to that protocol.

The WiMedia Alliance has defined a wireless Logical Link Control layer networking protocol for the UWB radio platform, referred to as the WiMedia Logical Link Control Protocol (WLP-formerly known as WiNet). The WLP standard is modeled after the IEEE 802 (Ethernet) environment, and is shown conceptually in FIG. 1. As a point of comparison, on the left side of FIG. 1 is an abstract representation of the ISO/OSI model for network protocol design in the IEEE 802 (Ethernet) environment. The network to stack 10 includes six layers, including Presentation layer 12, Session layer 14, Transport layer 16, Network layer 18, Data Link layer 20, and Physical layer 26 (PHY). Data Link Layer 20 is further subdivided into the Logical Link Control (LLC) sub-layer 22 and the Media Access Control (MAC) sub-layer 24.

Each layer within the stack performs a different function. For example, the data link layer encodes and decodes packets into bits and handles errors in the physical layer, flow control, and frame synchronization. The LLC sub-layer controls frame synchronization, flow control, and error checking. The MAC sub-layer controls how a computer on the network gains access to the data and permission to transmit. In particular, the MAC sub-layer provides a set of rules to determine how to access the transmission medium and transmit data. The physical layer is responsible for physically transmitting and receiving the data.

The network protocol stacks 30 and 40 correspond to wireless clients which may operate according to any wireless protocol, such as the WLP environment, or any other environment. In particular, stack 30 includes wireless layer 32, MAC layer 34, and PHY 36. Similarly, stack 40 includes wireless layer 42, MAC layer 44, and PHY 46. A wireless protocol, such as a WLP protocol as defined by the WiMedia Alliance, enables communication between two client devices at the LLC level. Likewise, communication is possible at the MAC level using the MAC protocol, and at the PHY level using the PHY protocol.

SUMMARY

A computer software architecture is disclosed which enables ad hoc wireless networking. Ad hoc networking enables devices to freely and arbitrarily associate themselves in networks, even if not part of a larger networking infrastructure. According to one aspect, a method and system are provided enabling identification and representation of multiple virtual wireless networks to an operating system. According to an aspect, a method and system are provided for securely configuring and connecting to wireless networks. According to another aspect, a method and system are provided for discovering wireless networks. Devices may be configured to communicate according to any ad hoc wireless protocol, of which WLP is one non-limiting example.

According to another aspect, a computer software architecture is disclosed which is compatible with the WLP standard for UWB networking. The software architecture to includes kernel mode and user mode components, and means for communication between the components. Various features of the software architecture enable a system to implement features specific to the WLP protocol, such as an ability to connect the system to multiple WLP networks simultaneously over a single physical adapter.

The software architecture comprises a multiplexing driver framework which may enable a computer system to connect to multiple WLP networks over a single physical adapter, such as a UWB network interface card. The multiplexing driver framework may operate by enumerating multiple respective interfaces between a same physical adapter and a plurality of upper layer networking stacks. The interfaces may be referred to as virtual ports.

The computer software architecture may comprise a user-mode module enabling the system to roam within available WLP networks. The roaming feature may enable continuous connectivity to a WLP network when the roaming system moves outside radio range of one access point of the network while remaining within radio range of another access point of the network. Furthermore, the user-mode of the computer system architecture may comprise a module communicating with the kernel-mode components, to perform such functions as deciding which WLP network to connect to out of a plurality of available WLP networks.

The computer system architecture may further comprise a driver for the UWB physical adapter. The driver comprises design features enabling its proper and effective performance in a UWB system implementing the WLP protocol.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Applicants have appreciated that wireless technology, such as UWB, promises new, powerful scenarios in computing. It is desirable to provide a computer system architecture compatible with wireless technologies, such as UWB technologies. In some embodiments described below, example implementations are shown as systems compatible with the Microsoft Windows® operating system, available from Microsoft Corporation of Redmond, Wash. However, the invention is not limited in this respect, as aspects of the invention are capable of implementation in various operating systems.

Figure 2:
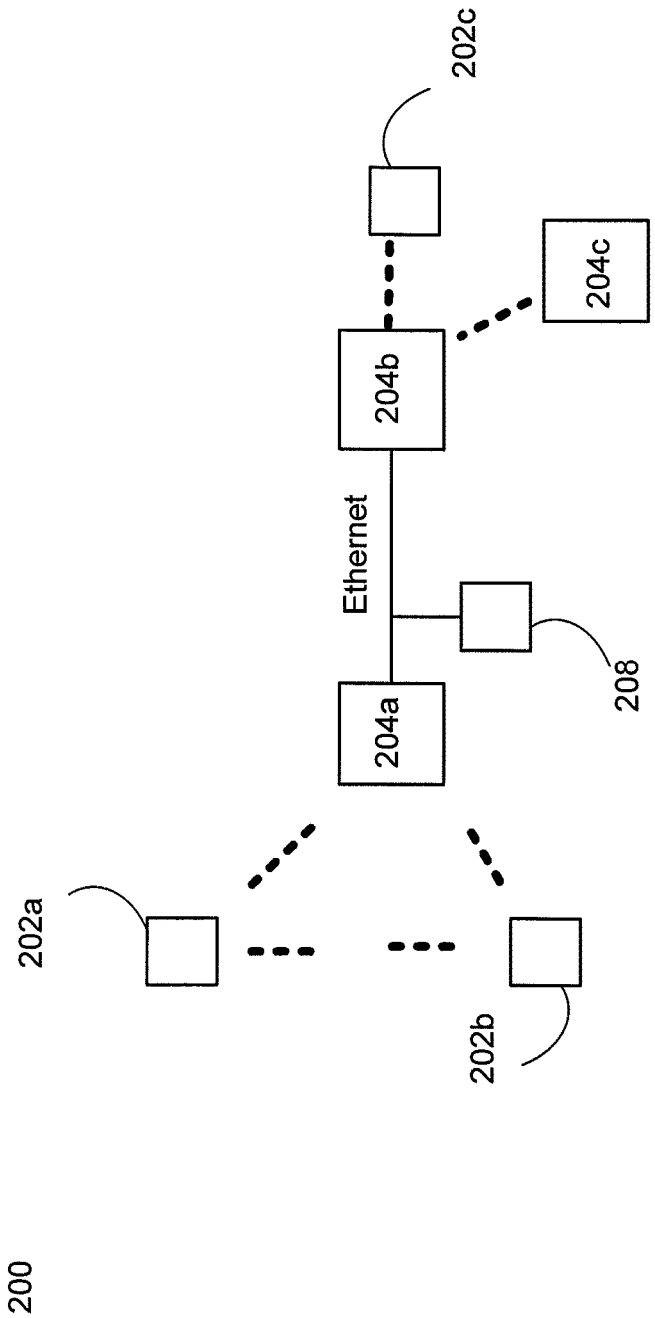
FIG. 2 is an illustration of a wireless network that may be achieved using various aspects of the present invention.

FIG. 2 illustrates one example of a network system involving wireless devices, such as UWB devices, which may be achieved using aspects of the present invention. The network system 200 includes client devices 202a-202c. The client devices are devices with wireless capabilities, such as but not limited to UWB capabilities, and may be any type of device, such as a laptop computer or other device. Depending on their locations relative to each other, the client devices 202a-202c may communicate via to different paths. For instance, client devices within radio range of each other, such as devices 202a and 202b may communicate directly via wireless links (indicated by dashed lines). By contrast, client devices outside of radio range of each other, such as devices 202b and 202c, may communicate via wireless links coupled with a bridge, such as bridges 204a, 204b, and 204c. Bridges may be coupled to each other within the network via Ethernet connections, such as provided by Ethernet modules 208.

The various types of components illustrated in FIG. 2 are capable of performing different functions. The client devices may implement any wireless protocol, such as the WLP protocol, and may be the original source or ultimate destination of data traffic conveyed in wireless frames, such as WLP frames. The bridges operate to provide bridge services to neighboring client devices. Specifically, the bridges forward frames to and from client devices that have requested bridge services. To support mobility, such as roaming, each client device may request bridge services from more than one bridge.

Figure 3:
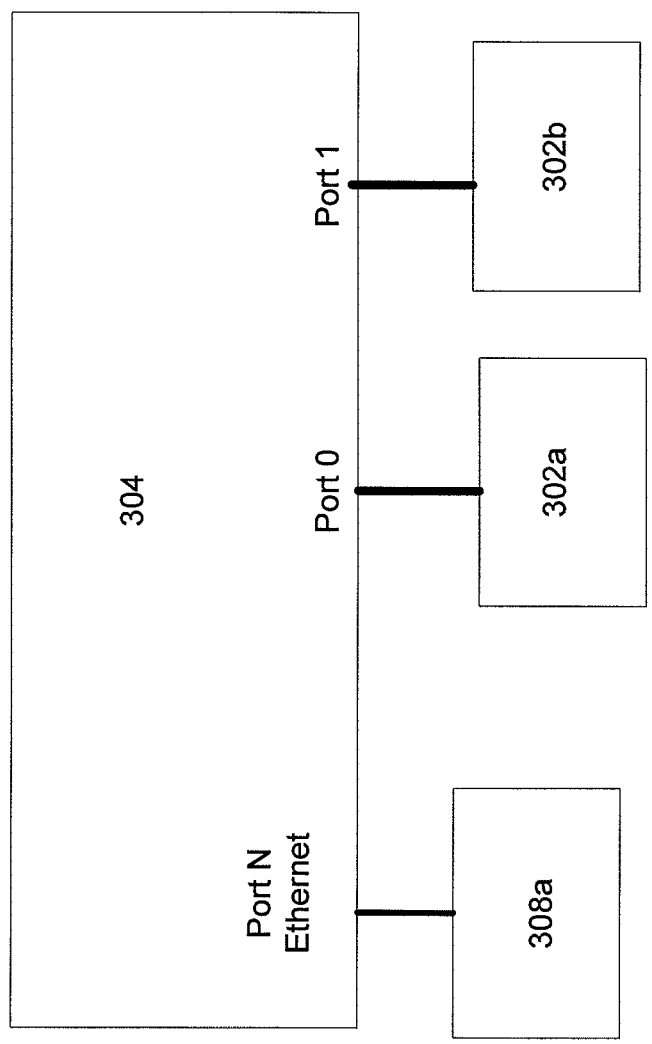
FIG. 3 is a more detailed illustration of the wireless bridge component of FIG. 2.

FIG. 3 illustrates an example of a bridge 304, such as bridge 204a in FIG. 2. The bridge 304 may be coupled to one or more Ethernet modules 308 via an Ethernet port. The bridge 304 may be coupled to wireless client devices 302a and 302b via MAC virtual ports.

The bridge 304 may service the neighboring client devices 302 which have explicitly requested bridge services from it. In particular, client devices may direct data, or frames, to a bridge so as to communicate with destination nodes reachable through the bridge. The bridge then takes appropriate action with respect to the frames. Neighbors requesting services from the bridge enable specific multicast addresses and protocols.

Applicants have developed a software architecture enabling ad hoc communication of wireless devices according to wireless protocols, such as, but not limited to, the WLP standard, within networks such as that illustrated in FIG. 2. The architecture comprises modules in both the user mode and kernel mode of the operating system of the device on which the software architecture is implemented. The user mode modules comprise a Roaming Service module as well as various plug-ins. The Roaming Service module enables the client device to roam within the wireless network while maintaining network connectivity. The various plug-ins are configured to enhance a user's experience. The kernel mode modules enable the system hardware to communicate with the user mode modules and the upper layers of the networking stack. The kernel mode modules are configured to enable connection to multiple WLP networks for a single UWB radio.

Figure 4:
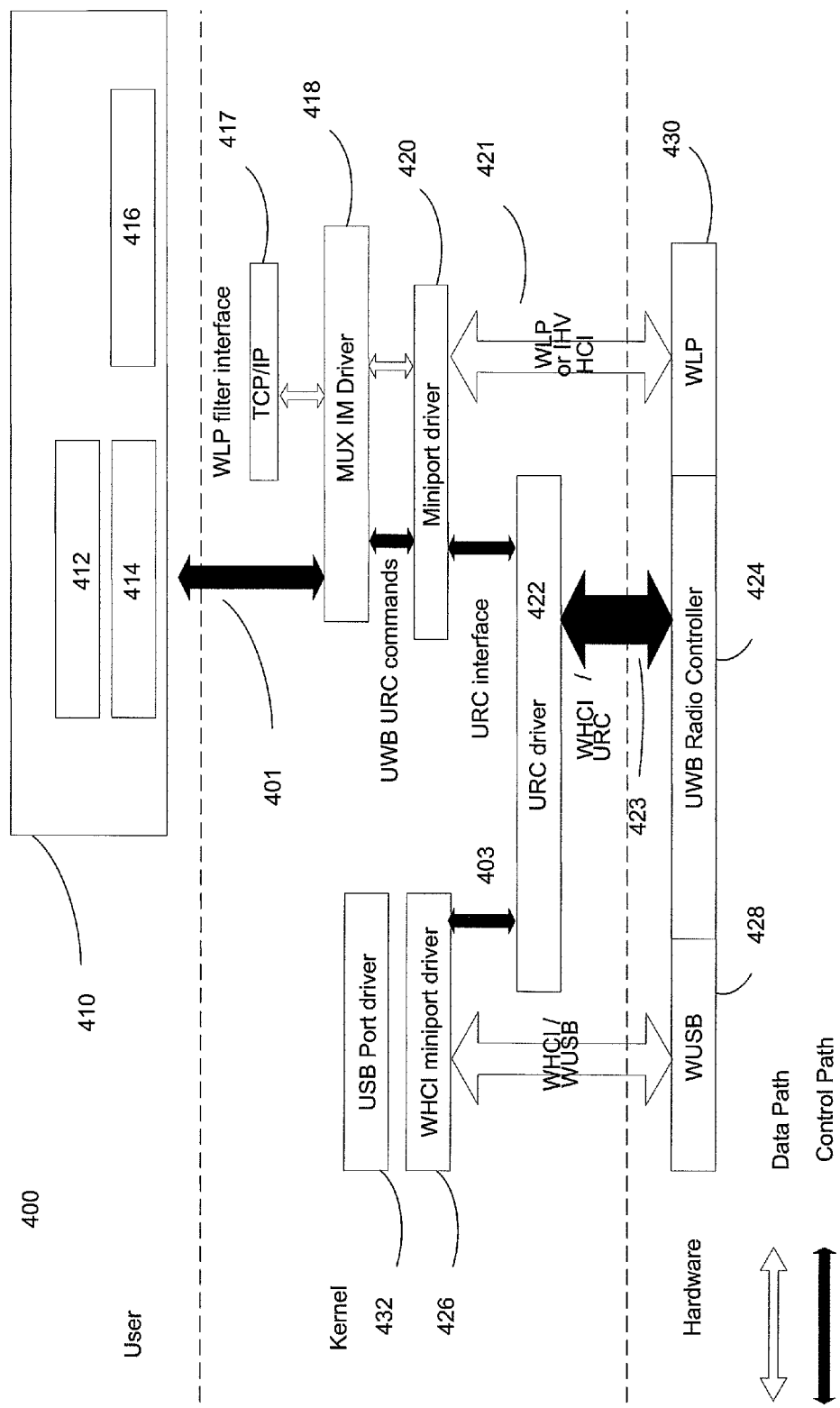
FIG. 4 is a block diagram of a software architecture offering system compatibility with WLP technology, according to an aspect of the invention.

FIG. 4 is a block diagram of some of the components of the software architecture. As shown, the architecture 400 comprises modules in both the kernel and user modes. Although the system architecture is designed for use with the Microsoft Windows® operating system, the present invention is not limited in this respect, as the concepts and design features can be applied to other operating systems.

Kernel Mode Components

As mentioned above, the WLP standard allows for connection to multiple networks simultaneously on a same radio. Applicants have appreciated that to achieve this functionality, it is desirable for the software architecture to allow a single physical adapter to expose multiple networks above it. Enabling a single physical adapter to expose multiple networks circumvents the need to design a computer system with multiple physical adapters to connect to multiple wireless networks, such as WLP networks. In one embodiment, this may be accomplished by using a multiplexing driver which enumerates multiple networks for a same physical adapter. The kernel mode modules have been designed with this in mind The kernel mode comprises various drivers and interfaces enabling the system hardware to communicate with the user mode components and the upper layers of the networking stack. In one embodiment, the kernel mode comprises a multiplexing (MUX) intermediate (IM) filter driver 418, which may be a WLP MUX IM filter driver, or any other type of MUX filter driver. The WLP MUX IM driver 418 may be a network driver interface specification (NDIS) multiplexing driver, or any other appropriate type of driver.

The WLP MUX IM driver 418 performs several functions. It enumerates WLP ports and controls the authentication state of the WLP miniport driver. It filters and directs WLP data packets to the appropriate WLP miniport driver and up to the TCP/IP stack 417. It also acts as a pass-through for some data frames between the user mode WLP security module 416 and the miniport driver 420. In one embodiment, it is also configured to control some MAC functionalities, such as a 4-way handshake. In some to embodiments, WLP MUX IM driver 418 can also adjust per-packet transmit-power levels.

The WLP MUX IM driver framework illustrated in FIG. 4 enables a single physical adapter to expose multiple networks above it. To do so, WLP MUX IM driver 418 binds to the underlying miniport driver. The WLP MUX IM driver 418 can create 1-N (1 through N) virtual miniports for each binding to the miniport driver, where N is a dynamic value. In other words, multiple virtual miniports can be created, or generated, for a single miniport driver. N may be set to have a predetermined minimum value, and could then be adjusted dynamically as needed to increase in value if more networks are detected or created. Alternatively, N may not have a minimum value, but rather may be capable of being adjusted dynamically from a value of one to any value. In one embodiment, each virtual miniport will have a locally unique network tag and virtual address. The virtual address can be a virtual EUI-48 address, or any other appropriate type of address. WLP MUX IM driver 418 may maintain the mapping relationship between any virtual miniports created and the miniport driver to which those one or more virtual miniports are bound.

In one embodiment, the WLP MUX IM driver exposes two sets of interfaces. First, at the miniport driver upper edge, it emulates the IEEE Ethernet 802.3 layer for WLP data packets. Specifically, WLP MUX IM driver 418 binds to a miniport driver 420 via an NDIS interface and exposes an Ethernet virtual minport to upper layer networking stacks, such as TCP/IP 417. The upper layer networking stack components see only the Ethernet interface, and may enable some or all existing network applications to work seamlessly on top of the WLP medium and to use the WLP medium as they would any other wired or wireless medium.

Second, at the intermediate edge, WLP MUX IM driver 418 exposes a set of private IOCTL (input/output control) interfaces (APIs) with which the user mode WLP Medium-Specific Module (MSM) 414 interacts. However, the invention is not limited in this respect, as other types of APIs may be used, and the type of API used may depend on the type of operating system used (e.g., Microsoft Windows® OS). In operation, the multiplexing nature of the WLP MUX IM driver enables the MSM module 414 to enumerate additional WLP miniports or to delete existing miniports.

WLP MUX IM driver 418 demultiplexes incoming data traffic and conversely will multiplex any outgoing data traffic over the miniport driver. As an example, on the send path (data sent from the system to an external system), the virtual miniport created by WLP MUX IM driver 418 receives the outgoing data packet from an upper layer network stack, such as TCP/IP 417. Because WLP MUX IM driver 418 maintains the mapping between the miniport driver and virtual miniports, it can determine which miniport driver any given virtual miniport is associated with. Then, WLP MUX IM driver 418 adds a WLP frame header, which comprises information regarding the network, on the outgoing packet and automatically forwards the packet to the appropriate underlying miniport driver.

Similarly, on the receive path (data sent to the system from an external system), the miniport driver receives an incoming data packet from the underlying hardware, such as UWB radio controller 424. WLP MUX IM driver 418 examines the WLP frame header of the packet and extracts the network tag and virtual EUI-48 address describing the path of the packet and the packet destination. WLP MUX IM driver 418 then can uniquely identify the virtual miniport over which to deliver the incoming packet.

As mentioned, the kernel mode comprises a miniport driver 420. The miniport driver 420 exposes a minport upper edge (the UWB MAC upper edge) and provides a method for accessing the WLP firmware. It exposes predefined object identifications (OIDs) with which WLP MUX IM driver 418 interacts. An example specification of the predefined OIDs is included at the end of this document. However, the invention is not limited to the OIDs explicitly described, as other OIDs could be used. The miniport driver 420 communicates with WLP hardware 430 via a WLP or host controller interface 421. The miniport driver 420 is further configured to communicate with a UWB radio controller driver (URCD) 422 via a UWB Radio Controller interface 403 to synchronize beacon information. The radio controller driver 422 communicates with hardware, such as a UWB radio controller 424 via a wireless host controller interface 423. The software architecture illustrated in FIG. 4 is also configured to enable WLP/UWB-capable devices to integrate with and operate seamlessly with a networking stack, such as a Microsoft Windows® networking stack, alongside wireless over UWB (WUSB) devices. Accordingly, the kernel mode further comprises a wireless host controller interface miniport driver 426 configured to communicate with the UWB radio controller driver 422. The wireless host controller interface miniport driver 426 also communicates directly with hardware, such as wireless USB 428, as shown. The kernel mode may further comprise a USB port driver 432 to enable proper operation of the system if a USB port is provided.

Various alterations and modifications to the architecture shown in FIG. 4 are possible. For example, in one alternative embodiment, the functionality of the WLP MUX IM driver 418 is integrated with the miniport driver 420. In an alternative embodiment, the WLP MUX IM driver 418 is split into a Bus Driver and a Lightweight Filter Driver. However, these are merely examples, as other alternatives are possible.

User Mode Components

In one embodiment, the user mode of architecture 400 comprises a Roaming Service module 410. Roaming Service module 410 comprises Auto Configuration module (ACM) 412, WLP Medium-Specific Module (MSM) 414 and WLP Security Module 416.

The Roaming Service module 410 may be provided to enable the devices connected to a wireless network to be mobile. For instance, referring again to FIG. 2, the client devices 202 may be mobile devices, such as laptop computers. When the devices move about, or roam, they may cease to be in radio range of the wireless network access point through which they were originally connected to the network, such as bridge 204a. The Roaming Service module 410 manages connectivity and roaming within the available WLP networks.

ACM 412 may be responsible for various tasks. In one embodiment, it starts and stops WLP components, manages profiles and detects and handles the arrival to and removal from the system of a WLP network interface card (NIC). It may also associate the appropriate MSM module with a NIC, and initiate discovery of available WLP networks and devices. It may select the WLP network to which to connect based on user preferences or default settings, and connect and disconnect a WLP network and a device. It may further configure WLP parameters for a selected network, and examine the connections to a network when the preference settings change. It may further provide management application programming interfaces (APIs) and notifications for upper layer applications. These are examples. Also, these functions need not be provided in a single module and may be distributed among multiple modules.

The MSM module 414 controls the interaction between the ACM 412 and WLP MUX IM driver 418, and may be configured to enable the ACM 412 to discover and connect to WLP networks.

The security module 416 may control all aspects of WLP security and configuration. In particular, it configures WLP ultra wideband hardware with security settings specified in a WLP profile. It then formulates, transmits and receives WLP configuration packets, and manages authorization of WLP ports. The security module may implement any protocol, as the present invention is not limited to using any specific protocol. In one embodiment, the security module implements a Simple Config protocol, which is a protocol developed by Microsoft Corporation (see e.g., http://www.microsoft.com/whdc/Rally/WCN-Netspec.mspx). However, any method of association may be used to configure a WLP network.

Figure 5:
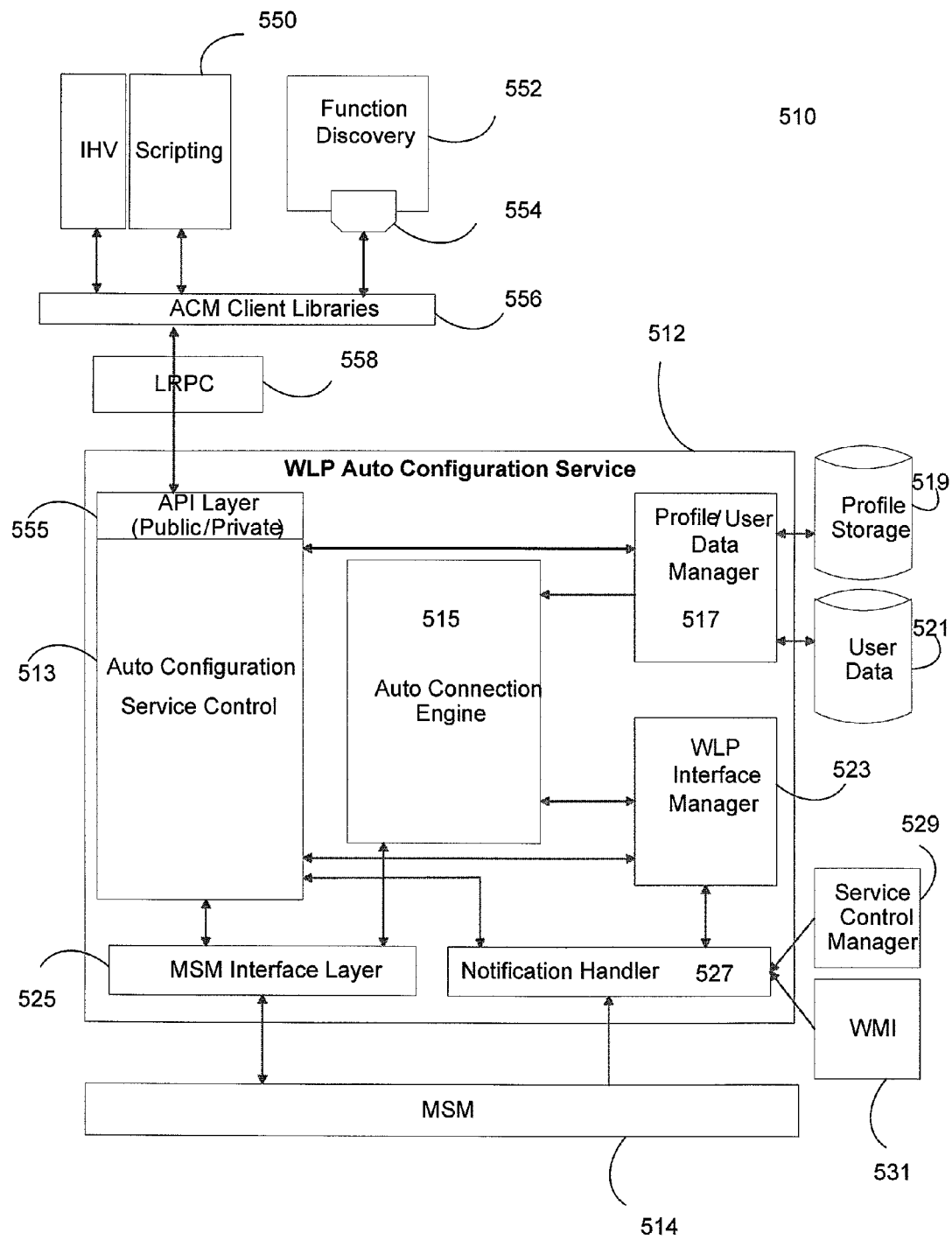
FIG. 5 is a more detailed block diagram of a portion of a software architecture of FIG. 4.

FIG. 5 illustrates one illustrative implementation of the Roaming Service module 410 of FIG. 4 in greater detail. However, it is just an example and other implementations are possible. The Roaming Service module 510 comprises Auto Configuration Module (ACM) 512. ACM 512 can operate in one of two modes, either manual or automatic. In manual mode, an application specifies each connect and disconnect request, and optionally specifies some of the radio settings. In automatic mode, the service will decide when and whether to connect or disconnect, and will manage all the settings by itself.

ACM 512 comprises numerous sub-components which enable it to perform its various tasks. One sub-component within ACM 512 is Auto Configuration Service Control component 513. Service control component 513 may perform one or more of the following tasks. When a WLP adapter (hardware device) arrives or the service starts, service control 513 may load the corresponding WLP MSM and may create an instance of the auto connection engine for each WLP adapter currently plugged into the machine. When a WLP adapter is removed or the service stops, service control 513 may unload the WLP MSM and delete the instance of the auto connection engine. Service control 513 may provide interfaces and private APIs, such as through API layer 555, to other system components. Similarly, service control 513 may provide public APIs to third party applications. Service control 513 may also interact with a user interface (UI) if desired, and perform functions such as sending notifications to a user and receiving user input.

Additional functionality may be achieved by incorporating a WLP scripting module 550 into the system. The scripting module 550 provides users with a command line interface for WLP setup, management and configuration tasks. It may access ACM 512 via client libraries module 556, and by way of local remote procedure call (LRPC) module 558. Similarly, Function Discovery module 552 interacts with a PSD plugin 554 to enable discovery of, and association with, services of the WLP media. Like scripting module 550, access for PSD plugin 554 to service control 513 may be through the client libraries module 556, by way of LRPC module 558.

Furthermore, service control 513 is configured to pass instructions to a profile/user data manager 517 for creating, updating, deleting, and querying profiles. The data manager 517 creates and updates profiles, deletes profiles, queries profiles, queries and manipulates preferred lists, and manages user data for a profile. Profiles may be stored in the profile storage 519. User data may be stored in a separate user data module 521. The profiles and user data may include unique names for identification, an indication of whether the profile is an automatic-connection or manual-connection profile, the source of the profile, information relating to whether the setting is global or interface-specific, user privileges, and security credentials. The type of information stored in the profile storage 519 and user data module 521 is not limiting.

Moreover, service control 513 may pass instructions to MSM 514 via a MSM interface layer 525. In this manner, service control 513 may get interface status data. It may also set and query user configurable parameters. It may also perform discovery, connection, and disconnect functions.

ACM 512 further comprises an Auto Connection Engine 515. The Auto Connection Engine 515 may perform various tasks, such as initiating the scan/discovery of WLP devices and networks. Auto Connection Engine 515 may collect lists of available devices and networks, and select which network to connect to based on profiles or manual user selection. Auto Connection Engine 515 may connect and disconnect from a network, and may maintain state machines for auto connection.

ACM 512 further comprises a WLP interface manager 523. The interface manager 523 is to configured to associate the WLP MSM to a WLP interface. It also sets and queries user configurable parameters for interfaces.

ACM 512 also comprises notification handler 527 which wraps and dispatches notifications received from MSM 514, service control manager 529 and Windows Management Instrumentation (WMI) 531. The WMI 531 may perform various functions, such as providing notifications for specific events including device arrival/removal, although the invention is not limited in this respect (see, e.g., http://msdn2.microsoft.com/en-us/library/aa394582.aspx).

Figure 6:
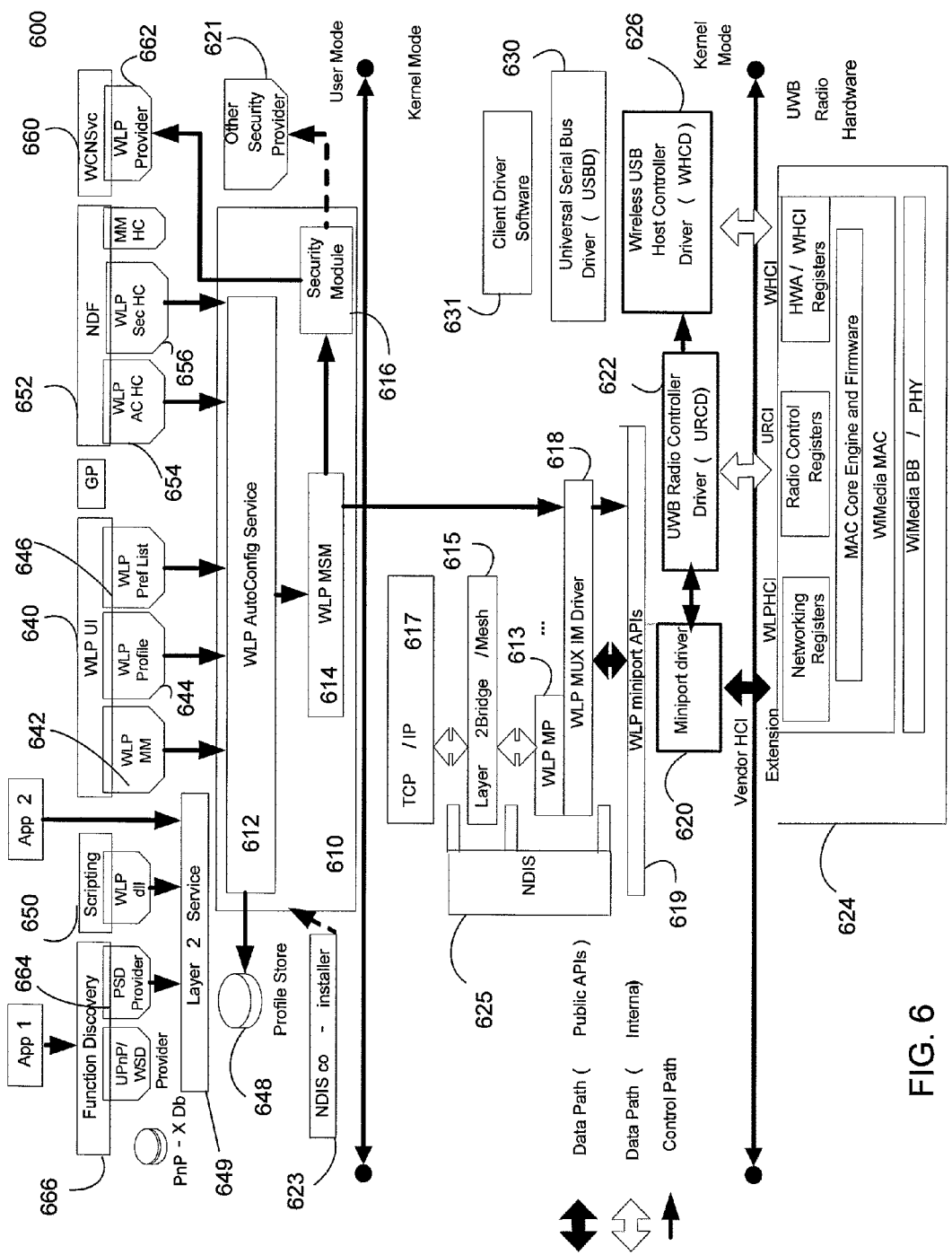
FIG. 6 is a block diagram of a software architecture offering system compatibility with wireless technology and including a plurality of user-mode plug-ins to enhance system operability, according to an aspect of the present invention.

FIG. 6 illustrates one example of a complete system architecture comprising components shown in FIGS. 4 and 5. As shown, the system includes components in both the user and kernel modes. For purposes of simplicity, not all components previously described in FIGS. 4 and 5 are described in detail with regard to FIG. 6. It should be appreciated that this is just one example of a complete system architecture, and that other implementations are possible.

Kernel Mode Components

The system architecture 600 comprises various kernel mode modules, with the driver architecture being similar to that shown in FIG. 4. The kernel mode modules communicate with the user mode modules via WLP MUX IM driver 618, which operates as previously described in connection with FIG. 4. WLP MUX IM driver 618 binds to the underlying miniport driver, and creates a virtual miniport instance 613. Thus, there may be multiple WLP virtual miniport instances 613 (indicated by the three dots). Each virtual miniport instance 613 corresponds to an exposed virtual miniport to which the upper layers, such as TCP/IP 617, can bind. WLP MUX IM driver 618 communicates with an optional layer 2 bridge 615 and TCP/IP stack using NDIS module 625. WLP miniport API 619 provides an interface between WLP MUX IM driver 618 and miniport driver 620. Similar to miniport driver 426 in FIG. 4, the miniport driver 620 can communicate directly with hardware 624, but is also configured to communicate with UWB radio controller driver 622.

Similar to the architecture shown in FIG. 4, the architecture 600 of FIG. 6 enables WLP/UWB-capable devices to integrate with and operate seamlessly with a networking to stack, such as a networking stack provided by the Microsoft Windows® OS or another OS. alongside wireless over UWB (WUSB) devices. Accordingly, the kernel mode of architecture 600 further comprises a wireless host controller interface miniport driver 626 configured to communicate with the UWB radio controller driver 622. The wireless host controller interface miniport driver 626 also communicates directly with hardware, such as radio hardware 624. The kernel mode may further comprise a USB port driver 630 to enable proper operation of the system if a USB port is provided. Client driver software 631 may also be provided if desired.

User Mode Components

As shown, architecture 600 comprises Roaming Service module 610, which in turn comprises Auto Configuration Service module 612, WLP MSM 614, and security module 616. These components act similarly to those described previously with respect to FIGS. 4 and 5, and are not discussed in detail further.

In addition to the components previously described in FIGS. 4, and 5, the architecture 600 may comprise a second security provider module 621. Various methods may be used to secure connections between devices implementing the system architecture 600 and other WLP devices. As previously mentioned, a Simple Config protocol is one instance of a security implementation. However, other mechanisms can be used to configure WLP configuration and security information. Methods not utilizing the Simple Config mechanism may implement an additional security provider, such as security provider module 621. The security provider module 621 may be installed on the machine implementing architecture 600 to provide compatibility with other WLP devices implementing the same instance of a security provider.

The illustrative architecture 600 also comprises several plugins providing additional functionality to the system. The user-interaction with the system may occur via three main components, shown as part of the WLP user interface (UI) 640. The WLP Media manager 642 is a plugin that enables the "View Available Network" user interface to display WLP networks to the user. It also enables users to connect to and disconnect from WLP networks. Secondly, the WLP Profile UI 644 enables a user to observe and manually change the WLP profile settings, such as security mode. Thirdly, the WLP to Preferred List UI 646 enables a user to order the re-order of WLP profiles and to create new profiles or delete existing profiles.

As previously described in connection with FIG. 5, the ACM 612 creates and stores profiles. The profile storage 648 is similar to profile storage 519 in FIG. 5, and functions to store user profiles which the user mode components can use in choosing which WLP networks to connect to. The profile storage may contain profiles, statistical data, and settings for WLP networks. The data may be stored in extensible markup language (XML) format, or any appropriate format, as the invention is not limited to any particular format.

Figure 1:
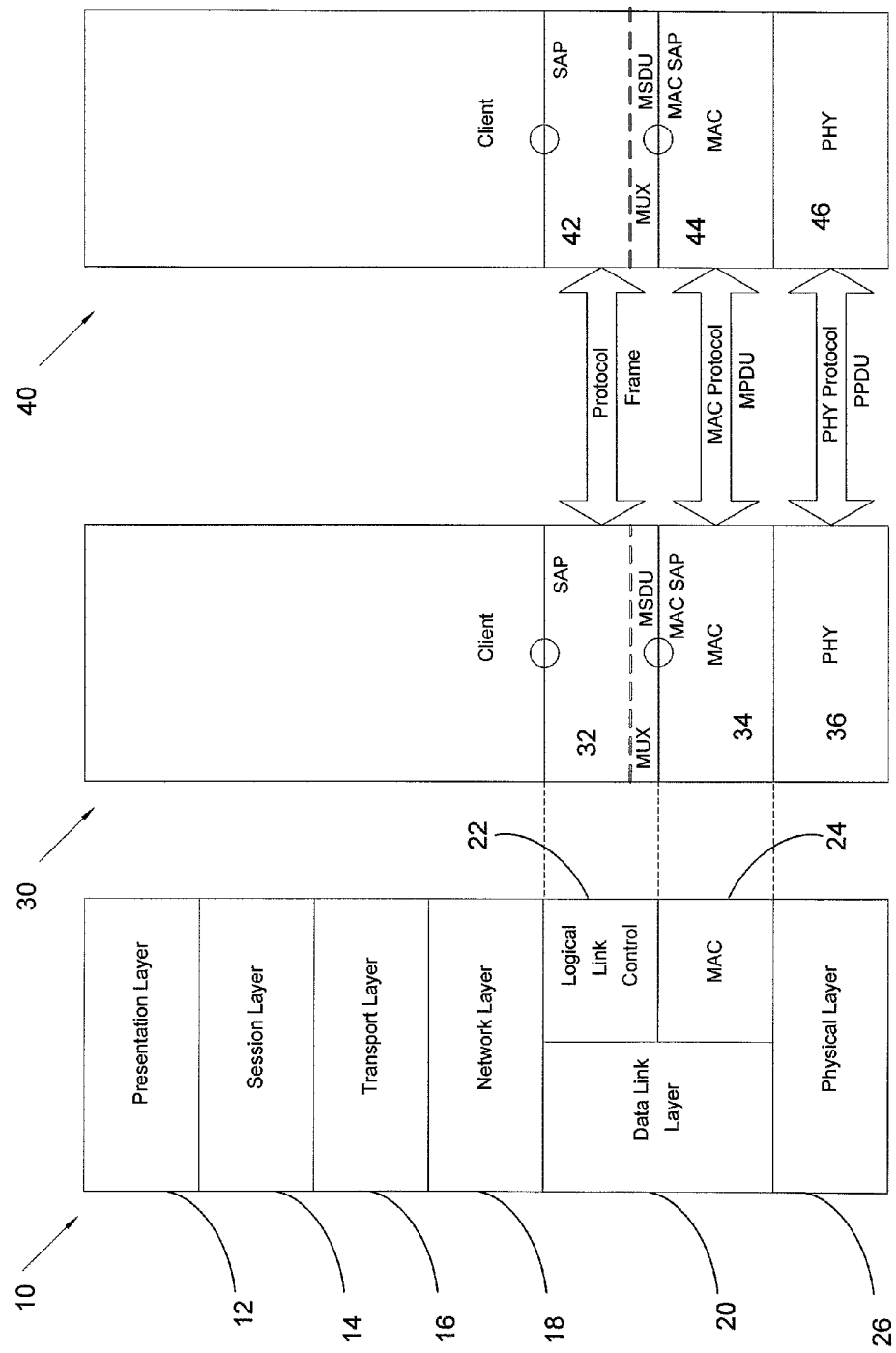
FIG. 1 is an illustration of network models for an IEEE 802 environment and for a wireless protocol network environment.

A layer 2 service 649 may also be provided as part of the architecture. The layer 2 service provides a set of APIs that can be used in a generic way to access any layer 2 wireless device. A layer 2 wireless device is any device which transmits data corresponding to layer 2 of the standard OSI networking model (see FIG. 1). The layer 2 service 649 may be used to unify control of layer 2 wireless devices into a single set of APIs which can be controlled by the UI 640, Function Discovery 666, or Scripting 650.

A WLP scripting module 650 may also be provided to enhance user interaction. The scripting module provides a user with a command line interface for WLP setup, management and configuration tasks.

A networking diagnostic framework (NDF) 652 may also be provided as part of the software architecture. It comprises WLP Auto Configuration Helper Class module 654 which interacts with the WLP Auto Configuration module to perform troubleshooting and diagnostics related to WLP connectivity. Similarly, the WLP Security Helper Class module 656 is provided to interact with the WLP Security module to perform troubleshooting and diagnosis of WLP security issues.

The WCNSvc module 660 provides a common discovery and association framework for various media types and transports. Any new transport of media type can interact via its own plugin. The WLP provider module 662 is a plugin for use with the Microsoft Windows® Connect Now service. It enables WLP client functionalities necessary to configure a WLP network. It may operate to solicit or confirm information from the user regarding the credentials for enrolling in a WLP network or for an external device to enroll in a local network.

The PSD plugin 664 interacts with the Function Discovery module 666 to enable discovery of, and association with, services of the WLP media. It can interact with the WLP Auto Configuration Service module 612 for discovery and scanning, association, and connection operations via the layer 2 service APIs.

The user mode also comprises NDIS co-installer 623. NDIS co-installer 623 enables WLP Auto Configuration Service module 612 when a WLP/UWB NIC is installed in the system. If no WLP radio is present, the Configuration Service module 612 is not started.

Various aspects of some embodiments the invention will be further understood by the description below.

WLP Stack Initialization

The WLP stack initialization may be completed as follows. The operating system (OS) loads the kernel-mode components. The URC driver 622 enumerates the WLP miniport driver 620, which in turn results in the initialization of the WLP MUX IM driver 618. The WLP MUX IM driver 618 creates a handle and binds to the miniport driver. When the WLP miniport driver's DriverEntry routine is called by the Plug and Play (PnP) manager, it calls NDIS to register and associate itself with NDIS.

PnP then calls NDIS' s AddDevice routine as a result of which NDIS creates a Functional Device Object (FDO) for the NIC and attaches the FDO to the device stack for the NIC. NDIS calls the WLP miniport driver 620 to initialize its miniport edge.

When the user-mode services are loaded by the Service controller (independently of the kernel-mode components), it will also load and initialize the WLP Auto Configuration service 612. The WLP Auto Configuration service 612 initiates its state machines and in turn loads and initializes the MSM 614 and Security module 616. The MSM module 614 opens a handle to the WLP MUX IM driver 618. The WLP Auto Configuration service 612 enumerates WLP devices and requests MSM 614 to perform initialization operations for each instance.

View Available WLP Networks

Figure 7:
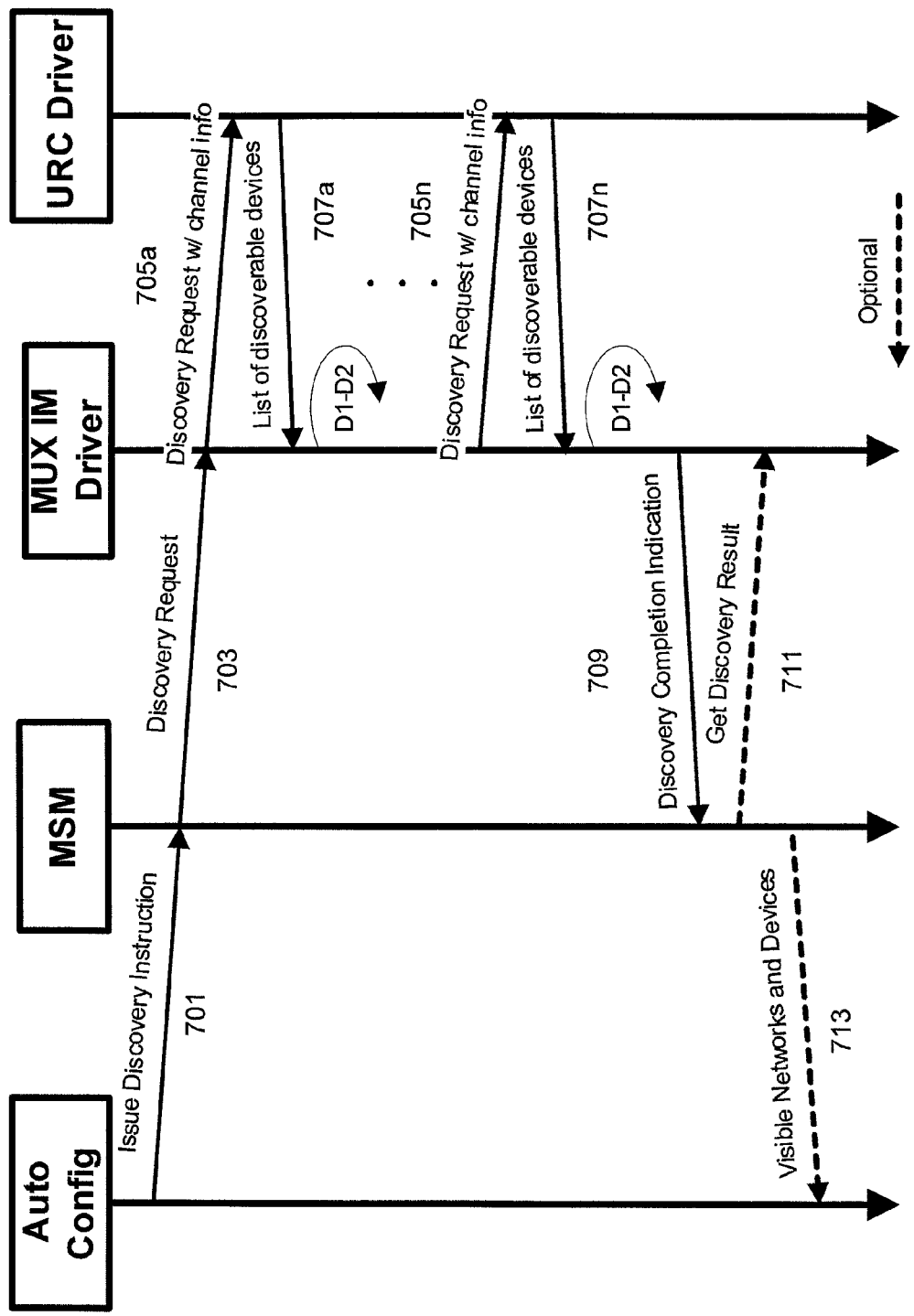
FIG. 7 is a sequence diagram that illustrates messages sent when a user requests to see available WLP networks.

FIG. 7 is a sequence diagram of messages sent between software components of the architecture 600 when a user desires to view available WLP networks. The "View Available Networks" (VAN) UI issues a discovery request to all of its Media Managers, one of which is WLP Media Manager 642. The WLP Media Manager 642 relays the discovery request to the WLP Auto Configuration Service module 612. Auto Configuration Service module 612 issues discovery request 701 to MSM 614 with discovery parameters that may include channel restrictions.

MSM 614 asynchronously issues a discovery request 703 to the WLP MUX IM Driver 618 to perform a discovery operation. The WLP MUX IM driver 618 determines the list of channels to scan for discovery, and switches to each channel (for a total of n channels) in turn 705a-705n for discovery. The WLP MUX IM Driver receives a list 707a-707n of beaconing WLP devices on each channel from the URC via the miniport driver 620.

In each channel, the WLP MUX IM Driver 618 exchanges D1-D2 discovery frames with all the beaconing devices. The WLP MUX IM Driver 618 sends the D1 frames via the miniport driver and also accumulates responses (D2 frames) to the WLP discovery request via the miniport driver 620.

Once discovery is complete 709, WLP MUX IM Driver compares the discovery result against the previously saved discovery results. If there is no change, the WLP MUX IM Driver 618 completes the MSM discovery request with a "no change" flag. Otherwise, it returns the new discovery result and completes the MSM discovery request with a "change" flag. MSM forms a list of visible network names and configuration parameters 711, and indicates discovery complete notification 713 to Auto Configuration Service module 612.

Discover and Connect to a Special-Function WLP Device

Discovery of a special function device may be initiated from within an application's Setup or via the Network Explorer UI. The common entry path for discovering layer 2 devices will be through the Layer 2 API interface. As such, the to application would not be aware of what networking technologies are available, nor would it be aware of any specific association methods.

Figure 8:
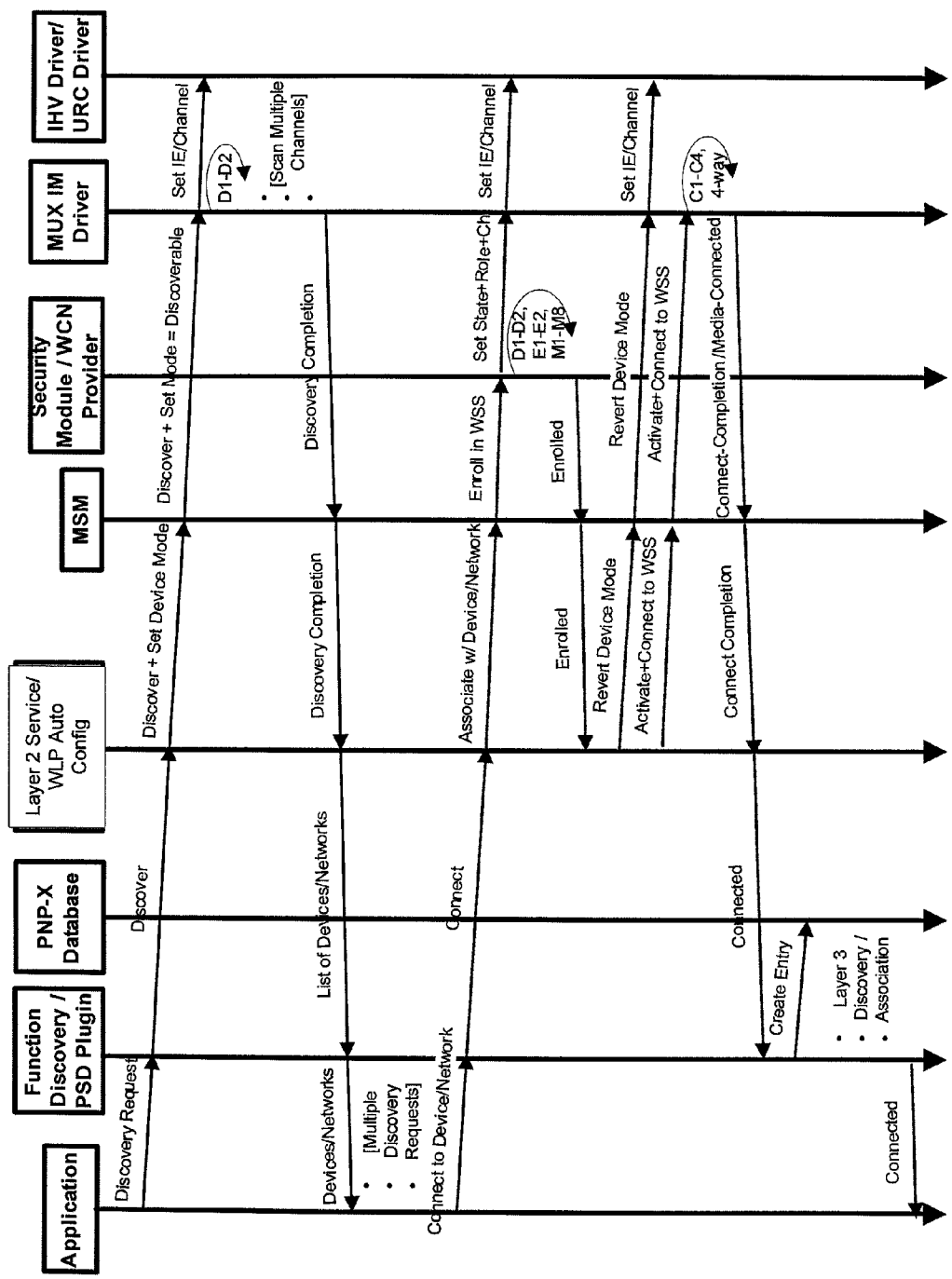
FIG. 8 is a sequence diagram that illustrates messages sent when a system connects to a WLP device or network.

The sequence of requests can be seen in FIG. 8. The Application which is trying to discover devices queries the Function Discovery module 666 for a specific class of devices (or services). The Function Discovery module 666 may in turn call the Proximity Service Discovery (PSD) plugin 664 to query for layer 2 devices. The PSD plugin will relay the query to the WLP Auto Configuration Service module 612 via the Layer 2 Service.

To detect discovering and discoverable devices, WLP Auto Configuration Service module 612 may put the WLP service in discoverable mode and respond to discovery requests from other devices as well. After WLP Auto Configuration completes the discovery process, it will send the list of discovered and discovering devices back up the call stack, all the way up to the Function Discovery module 666.

This list of devices is parsed and customized by the Function Discovery module for the application depending on any specified filter and returned to the application. The application (or user) then chooses the device to connect to and calls the Query object's association interface. This call is relayed to the PSD plugin which results in a call to the WLP Auto Configuration's Connect API.

WLP Auto Configuration Service module 612 initiates the WLP association and uses Simple Config to configure the device. The WLP Security module 616 communicates with the WCN via the WLP WCN provider for the Simple Config protocol.

Once the layer 2 connection is setup, the Function Discovery PSD plugin creates an entry in the PNP-X database for the new device. Once the entry is created in the PNP-X database, UPnP discovers the device and proceeds to discover and install the device.

In the meantime, the application has registered for PnP notifications and gets notified once the device has been installed.

First-time Connection to a WLP Network

The first time a system connects to a WLP network, the following steps may be taken. If the application wants to discover and connect to a wireless network, it can use the Layer 2 Service APIs directly to discover and connect to the WLP network. The application calls the Layer 2 Service APIs to query for available networks. The Layer 2 Service queries the WLP Auto Configuration service, which returns a list of discoverable networks.

The application then picks a network to connect to and issues a connect request to the Layer 2 Service APIs, which in turn pass the request on to WLP Auto Configuration Service module 612. WLP Auto Configuration Service module 612 proceeds to setup the connection to the WLP network. If the network is secure, then the WLP Security Module 616 will handle the SimpleConfig with the help of the WCN WLP plugin to configure the network.

Once the network is successfully configured, the network profile is saved by Auto Configuration Service module 612 for future connections.

Simultaneous Connection to Multiple WLP Networks

As has been discussed, the WLP standard enables connection to multiple WLP networks simultaneously. Using the architecture disclosed above, this functionality may be achieved as follows. If the list of profiles for WLP networks includes at least two networks, both of which are simultaneously visible, and the service settings allow for simultaneous connection to multiple networks, the WLP Auto Configuration service 612 will attempt to bring both networks online The WLP Auto Configuration service 612 will identify an available (disabled) WLP device instance that it can use to configure the second network. If none is available, it will first call the bus driver to create a new WLP device. If the device is currently disabled, the Auto Configuration service will call the PnP manager to enable the device.

Since the new device instance has been identified as a WLP device, the operating system may notify the miniport driver 620 of a new device instance. The miniport driver to will bind to the new device instance and register it with NDIS. Once the WLP Auto Configuration service is notified of the new device, it may initialize it via the MSM 614. The WLP Auto Configuration service may then proceed to setup the second connection on that device instance.

Managing WLP Profiles

It may be desirable to manage WLP profiles. In one embodiment, a user interface provides information and control to a user for connected WLP networks in the operating system. In one embodiment, the user interface mechanism may be a "Network Center," although any type of user interface mechanism may be provided, and the invention is not limited in this regard. A Network Center may have a link for managing wireless profiles. In one embodiment, if a user wants to manage a WLP profile, Network Center calls the necessary APIs from WLP Profile 644, which in turn proxies the request to the WLP Auto Configuration Service module 612. In another embodiment, Network Center may call the Common Layer 2 APIs from Layer 2 Service 649, which in turn proxy the request to the WLP Auto Configuration Service module 612.

Network Center may load the profile from WLP Profile 644 via the provided APIs. Alternatively, in one embodiment Network Center may load the profile from the Profile Store 648 via the Common Layer 2 APIs if Layer 2 Service 649 is implemented as part of the architecture 600. The WLP profile containing settings for Auto Configuration Service module 612, MSM 614, and Security Module 616 is displayed in the Advanced Profile UI.

If the user makes any changes to the WLP profile, the profile is validated by the WLP Auto Configuration service for the Auto Configuration portion of the profile. Auto Configuration then passes the rest of the data to MSM 614 for it to validate its section. After MSM 614 validates connectivity settings, it passes the profile to Security Module 616 for security settings validation. After all the components have validated the profile, Auto Configuration Service module 612 saves the profile in the profile store 648.

If the new profile results in a change to the current connections, Auto Configuration resets its connection state machine.

As should be appreciated from the foregoing discussion and non-limiting examples, one aspect of the invention provides a multiplexing driver framework in a WLP compatible software architecture. The multiplexing network driver framework may enable the system to connect to a plurality of WLP networks simultaneously over a single physical adapter.

According to another aspect of the invention, a miniport driver is provided for use in a software architecture offering WLP capabilities. The miniport driver may be configured to communicate with a multiplexing network driver. The miniport driver may comprise commands specific to use in a WLP environment.

According to another aspect of the invention, a software architecture providing WLP compatibility comprises a roaming service enabling a UWB device to roam within radio range of available WLP networks. The roaming service may comprise modules providing communication between the kernel mode and user mode of the software architecture. The communication may comprise data and control signals for determination of which WLP network or networks to connect to out of a plurality of available WLP networks. The roaming server may further comprise security functionality for managing security functions of the UWB device.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

For example, while some of the figures and embodiments have been described as utilizing a WLP wireless protocol, any ad hoc wireless protocol can be used, of which WLP is merely one example. The technology is not limited in this respect. Rather, the architecture and methods described herein may be used to provide ad hoc wireless connectivity utilizing any wireless networking protocol. Moreover, several embodiments and examples have been described as being compatible with UWB technology. However, the architecture and methods disclosed herein may operate with other wireless technologies besides UWB technology, as the invention is not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or to multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Example of Predefined Object Identifications (OIDs)

As described above, according to one or more aspects of the present invention a miniport driver is provided, such as miniport driver 420 in FIG. 4. The miniport driver may expose predefined object identifications (OIDs) with which a MUX IM driver may interact. An example specification of the predefined OIDs, which are NDIS OIDs in the example, is now provided. However, it should be recognized that other OIDs are possible and the invention is not limited in this respect.

Miniport Interface (NDIS OIDs)

OID WINET QUERY DEVICE INFORMATION

This OID request queries the device specific information and firmware capabilities (WLP version of the device, device name, manufacturer name, etc). The format of the buffer is as below:
WINET_DEVICE_INFORMATION+EU148 addresses list+VendorHCISpecific Data The WiNet miniport driver should complete this OID request with NDIS_STATUS_SUCCESS or some appropriate error as soon as possible.

Query Data Structure Definition:
Input: none.
Output: WINET_DEVICE_INFORMATION structure, defined as follows

WINET DEVICE INFORMATION typedef struct_WINET_DEVICE_INFORMATION {
NDIS_OBJECT_HEADER Header;
ULONG AddressListOffset;
UCHAR WiNetVersion;
UCHAR DeviceNameLength;
UCHAR DeviceName[32];
UCHAR ManufacturerNameLength;
UCHAR ManufacturerName[64];
UCHAR ModelNameLength;
UCHAR ModelName[32];
UCHAR ModelNumberLength;
UCHAR ModelNumber[32];

What is claimed is:

1. A method of enabling a computer system to connect to a plurality of ad hoc wireless networks using a same physical adapter, the ad hoc wireless networks of the plurality of ad hoc wireless networks each implementing an ad hoc network protocol for communications, the method comprising:
  binding a driver to the physical adapter, the physical adapter configured to receive data from each of a plurality of available ad hoc networks;
  using the driver to create an interface between the physical adapter and at least one upper layer networking stack for each of at least two of the available ad hoc networks simultaneously; and
  sending an outgoing data packet from the at least one upper layer networking stack to the driver and using the driver to: (i) add a network protocol frame header to the outgoing data packet; and (ii) forward the data packet over the physical adapter.

2. The method of claim 1, wherein the interface comprises a plurality of interfaces comprising at least one interface between the physical adapter and the at least one upper layer networking stack for each of the at least two of the available ad hoc networks, and wherein at least one interface of the plurality of interfaces created by the driver is a virtual interface.

3. The method of claim 2, further comprising using the driver to maintain mapping information mapping the at least one virtual interface to the physical adapter.

4. The method of claim 2, wherein the at least one virtual interface emulates an IEEE Ethernet connection to the at least one upper layer networking stack.

5. The method of claim 4, wherein the upper layer networking stack comprises a TCP/IP networking component.

6. The method of claim 1, wherein the driver is a kernel mode module, and wherein the method further comprises using the driver to expose a set of private interfaces with which user mode modules of the computer system interact.

7. The method of claim 1, further comprising receiving an incoming network protocol data packet on the physical adapter and using the driver to examine a network protocol frame header on the incoming network protocol data packet and extract a network identification tag.

8. A computer-readable storage device having computer-executable instructions stored thereon, the computer-executable instructions configured to, when executed by at least one processor, cause performance of a method comprising:
  binding a driver to a physical adapter of an electronic device;
  identifying a plurality of available ad hoc networks;
  using the driver to create an interface between the physical adapter and at least one upper layer networking stack simultaneously for each of at least two available ad hoc networks of the identified plurality of available ad hoc networks, thus resulting in creation of at least two interfaces;
  adding a network protocol frame header to an outgoing data packet using the driver; and sending the outgoing data packet from the at least one upper layer networking stack over the physical adapter via an interface of the at least two interfaces.

9. The computer-readable storage device of claim 8, wherein at least one of the at least two interfaces created by the driver is a virtual interface.

10. The computer-readable storage device of claim 9, wherein the method further comprises using the driver to generate mapping information mapping the at least one virtual interface to the physical adapter.

11. The computer-readable storage device of claim 10, wherein the at least one virtual interface emulates an IEEE Ethernet connection to the at least one upper layer networking stack.

12. The computer-readable storage device of claim 8, wherein the method further comprises receiving on the physical adapter an incoming network protocol data packet and extracting a network identification tag.

13. The computer-readable storage device of claim 8, wherein the driver is a kernel mode module, and wherein the method further comprises using the driver to expose a set of private interfaces with which user mode modules interact.

14. A computer system configured to connect to an ad hoc network, the computer system comprising:
 a memory configured to store computer-readable instructions; and
 at least one processor configured to execute the computer-readable instructions, the computer-executable instructions including instructions for performing operations, the operations comprising:
 using a driver to create multiple simultaneous interfaces between a physical adapter of the computer system and a TCP/IP layer by creating an interface between the physical adapter and the TCP/IP layer for each of at least two available ad hoc networks simultaneously;
 receiving an incoming data packet on the physical adapter;
 extracting from the incoming data packet a network protocol frame header including a network identification tag identifying a first ad hoc network of the at least two available ad hoc networks to which the incoming data packet belongs; and
 directing the incoming data packet to one of the multiple simultaneous interfaces to which the first ad hoc network corresponds.

15. The computer system of claim 14, wherein at least one of the multiple simultaneous interfaces created by the driver is a virtual interface.

16. The computer system of claim 15, wherein the operations further comprise using the driver to generate mapping information mapping the virtual interface to the physical adapter.

17. The computer system of claim 14, wherein the operations further comprise using the driver to add a network protocol frame header to an outgoing data packet and forwarding the outgoing data packet over the physical adapter.

18. The computer system of claim 14, wherein the incoming data packet conforms to a wireless networking protocol.

19. The computer system of claim 14, wherein the computer-readable instructions are part of a kernel mode module of the driver.

20. The computer system of claim 14, wherein the computer system comprises a laptop computer which includes the at least one processor.

* * * * *